June 15, 1937. P. M. SALERNI 2,084,219
POWER TRANSMISSION MECHANISM
Filed Aug. 1, 1932 5 Sheets-Sheet 1

Inventor:
Piero Mariano Salerni
Attorneys

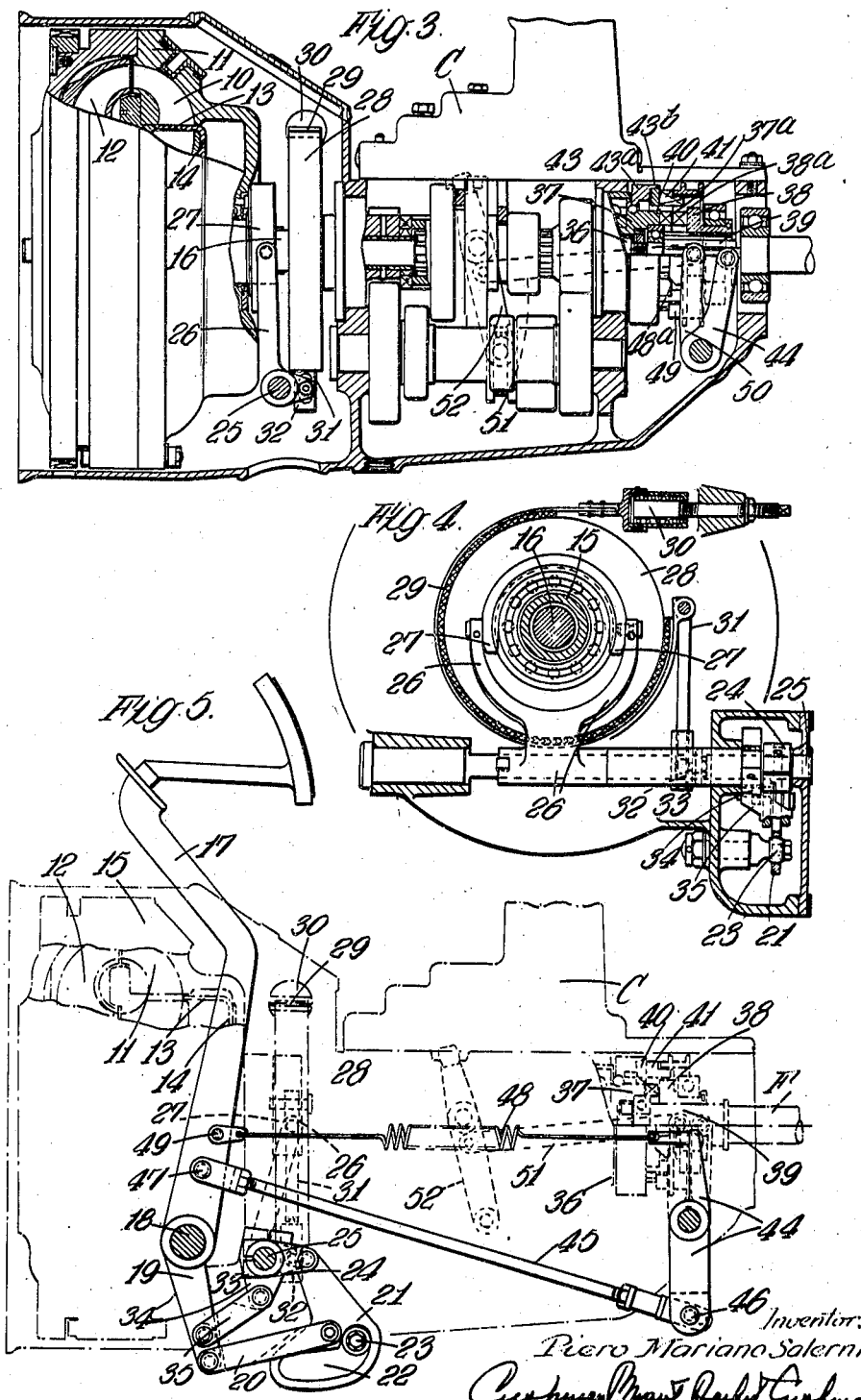

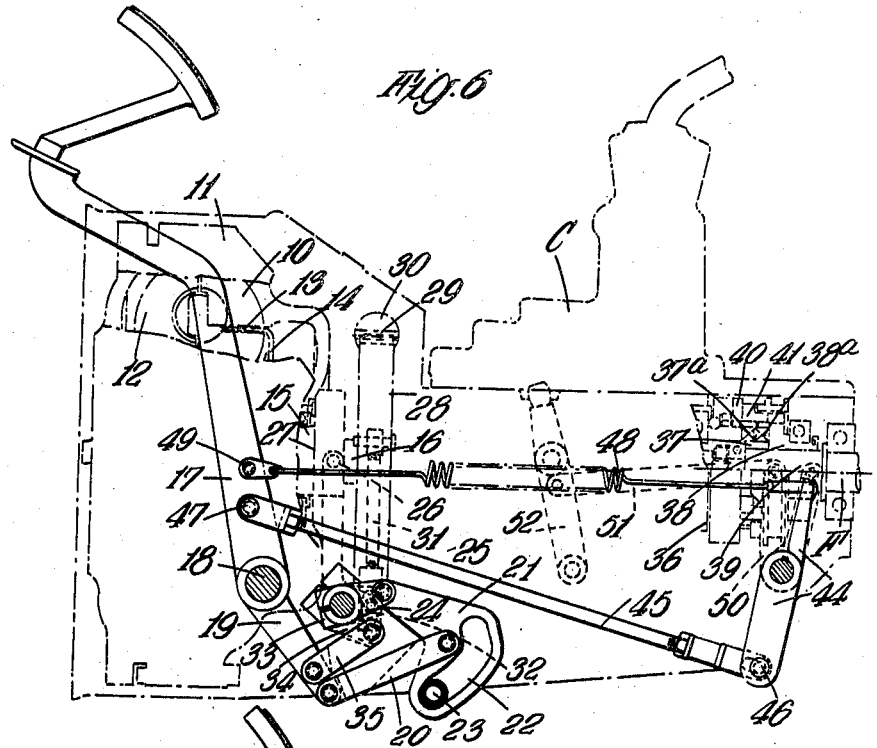
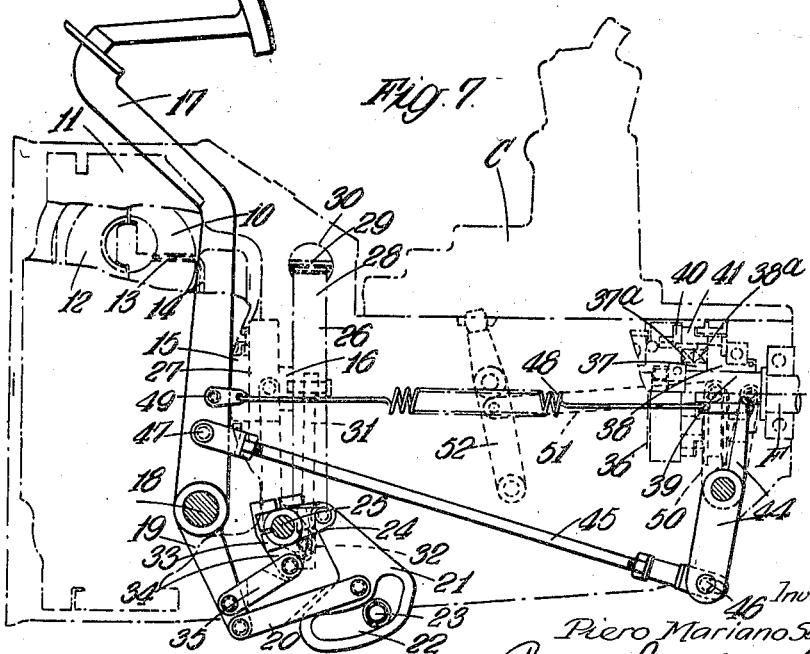

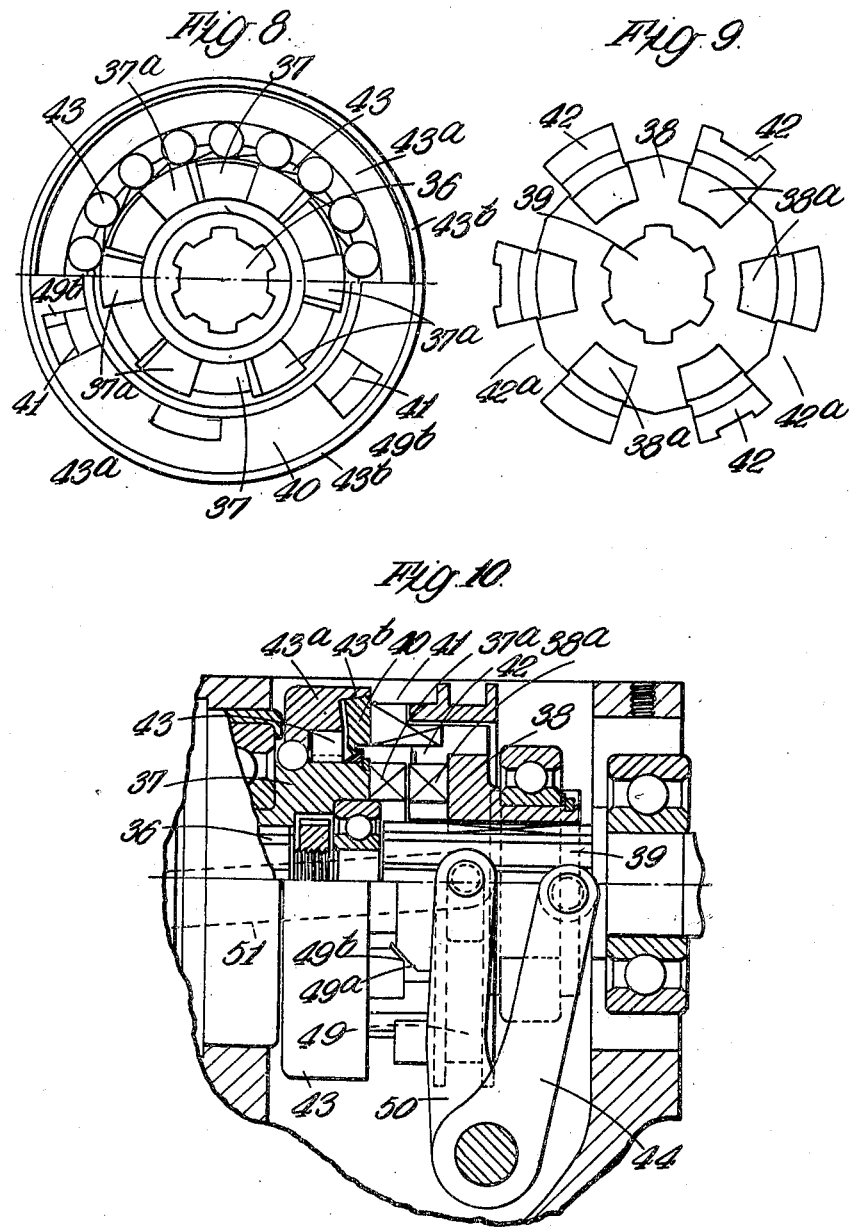

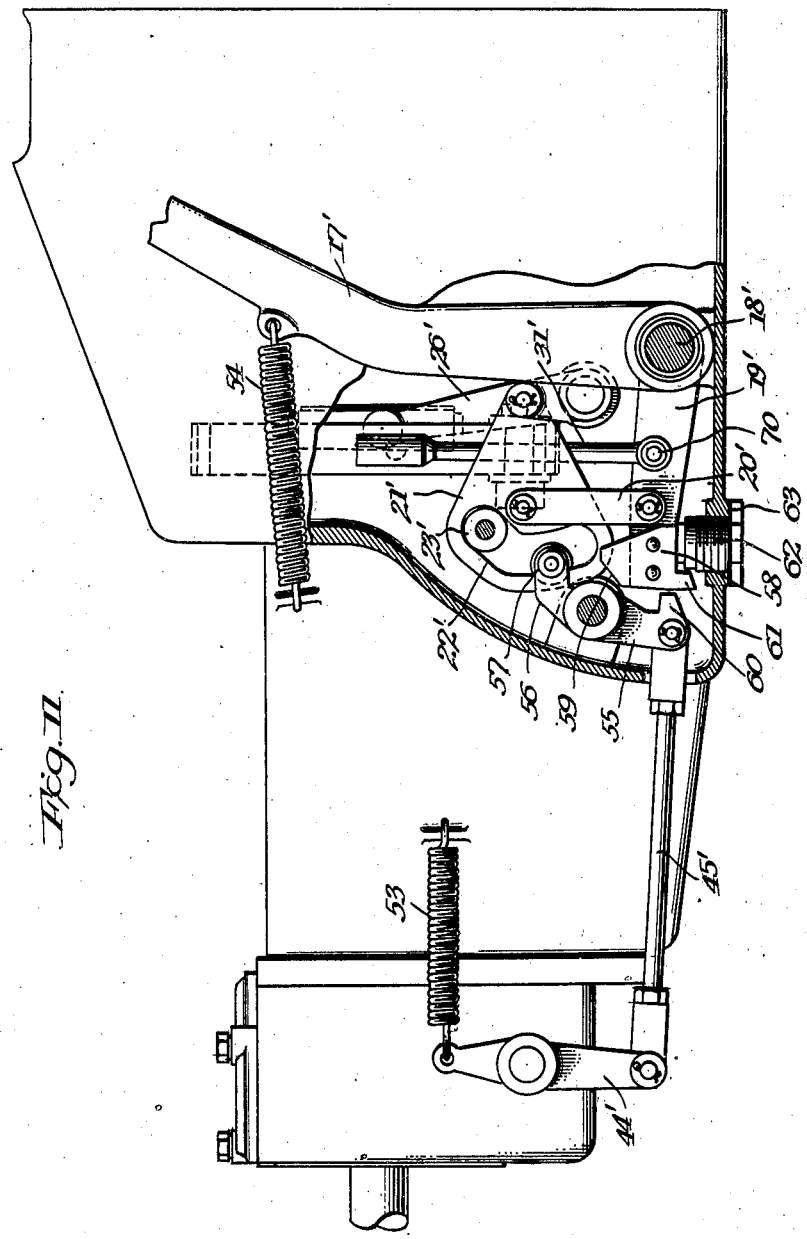

Patented June 15, 1937

2,084,219

UNITED STATES PATENT OFFICE 2,084,219

POWER TRANSMISSION MECHANISM

Piero Mariano Salerni, Westminster, England

Application August 1, 1932, Serial No. 627,196
In Great Britain August 13, 1931

16 Claims. (Cl. 74—189.5)

This invention relates to power transmission mechanism such as is used for mechanically propelled vehicles. When the transmission mechanism of a mechanically propelled vehicle comprises means for interrupting the transmission for the purpose of coasting to facilitate gear change, of the kind which operates so as to re-connect the transmission upon one member thereof attaining synchronism or substantial synchronism (either rotational or static) with another member thereof (such as for example synchronized couplings of the Salerni type, one-way clutches, free wheels or the like) it is found, if the power is transmitted through frictional means such as an ordinary engine friction clutch or friction brakes associated with an epicyclic gearing, that unless gear changing or re-connection is effected at the instant at which the engine attains or is brought to the speed which corresponds to that of the road wheels having regard to the ratio of the gear being engaged, friction slip must occur at, and with resulting damage to, the points at which power is transmitted through friction. Therefore, with mechanism of this kind in order to avoid the possibility of damage, gear changes must be effected with no greater rapidity than that with which the engine can be accelerated or decelerated to the requisite speed, a method presenting disadvantages particularly when rapid change of gear is required when a vehicle is climbing a hill and which the ordinary driver is not inclined to follow, with the result that appreciable slip on the friction faces takes place whenever a gear is changed, and experience has shown that damage frequently results. The present invention obviates this disadvantage by the elimination of frictional connection and by substituting therefor a hydraulic connection of the kind in which the friction slip between the engine and the driven member is taken by the liquid without damage to the parts. If the driven member of the hydraulic connection can be decelerated or stopped irrespective of the speed of the engine, gear changing can be effected rapidly regardless of the speed of the engine and when the transmission becomes re-connected, any discrepancy or difference between the speed, of the engine and that of the driven part is taken up by the liquid. In accordance with this invention I provide in a transmission comprising a variable speed gear and interrupting means of the kind referred to, a hydraulic connection with means whereby the driven part of the hydraulic connection can be decelerated or stopped regardless of the speed of the engine and with comparatively little or no braking effect on the engine. This is effected by the provision of means for controlling or varying the circulation or flow of liquid in the hydraulic connection, and in some cases by the simultaneous or subsequent application of a clutch stop or brake to the driven part of the hydraulic connection. If the brake were applied to the driven member of the hydraulic connection without controlling the circulation or flow of the liquid, the braking action would not materially decelerate the driven member or bring it to rest with the requisite rapidity as the engine would have to be braked with it, and the time required to decelerate or arrest the driven member would therefore be to a great extent dependent on the time required to decelerate the engine itself. By means of the present invention, gear changing can be effected rapidly with little or no regard to the speed at which the engine can be decelerated. For the purpose of the present invention the power transmission mechanism comprises a hydraulic power transmitter interposed between the engine and a variable speed gear of any suitable type, in conjunction with an interrupting device in the transmission, the transmitter being provided with or having associated therewith means whereby the circulation or flow of liquid therein can be controlled or varied for the purpose of checking or interrupting the action of the transmitter for gear changing purposes. Further, according to this invention, the interrupting device is disposed between the variable speed gearing and the driven road wheels of the vehicle. Also, there is provided a brake or clutch stop for acting on the driven member or shaft of the transmitter, this brake being preferably operated when the transmitter controlling means are operated. The transmitter controlling means which may comprise a valve that can be inserted from the inoperative position into the liquid circuit to interrupt or stop the circulation or flow of the liquid, may be operatively connected with the transmitter brake, and in some cases with the aforesaid interrupting device. When the construction is such that the controlling means of the transmitter, the aforesaid transmitter brake and the interrupting device are inter-connected so as to co-operate, the arrangement may be such that the operating means when actuated, for example by the movement or depression of a single lever or pedal, first causes the circulation or flow of the liquid in the transmitter to be interrupted or varied and at the same time or subsequently, the transmitter brake may be applied, and preferably the interrupting device is disconnected or actuated prior to an effective application of the brake to provide the interruption in the transmission. When the interrupting device is located between the variable speed gearing and the vehicle driving wheels, the said gearing is isolated or practically isolated owing to its disconnection from the aforesaid driving wheels and to the reduction of torque thereon due to the transmitter being controlled as aforesaid. The means for providing the interruption are preferably such that they enable the driving connection at this point to be re-established when the driving and driven elements adjacent to the interruption attain rotational synchronism. For example, I may provide a coupling which may be of the Salerni type, in which the coupling members when engaged, provide a positive bi-directional drive, in conjunction with means that operate to prevent engagement of the coupling members so long as they are rotating at different speeds, but which permit or enable the members to engage when rotational synchronism is attained. The hydraulic transmitter which may be of the torque converting type as set forth in the specification of my British Patent No. 362,952, is preferably provided with a controlling valve which is operable at will or otherwise, for example, by means of a lever, pedal or the like that may also apply the transmitter brake and disengage the aforesaid coupling to provide the interruption in the transmission as hereinbefore referred to, so that when the valve is operated to close completely or partially the hydraulic circuit in the aforesaid transmitter, the coupling is disengaged to provide the interruption, thus isolating the gear box for the purpose of facilitating gear changing operations. Preferably the clutch stop or transmitter brake is operated at the moment of or after the disengagement of the coupling, so that the rotating parts can be quickly decelerated or brought to rest. The valve of the hydraulic transmitter may be so arranged that it remains closed until after re-connection or driving engagement is established at the interruption, for example, by re-coupling the coupling members. When the transmitter brake (if this device be used) is released, the drag or rotational movement that may be imparted to the driven member of the transmitter, whilst the valve is closed or partially closed, especially when the engine is accelerated, will speed up the rotating parts in the variable speed gearing so as to increase the rotational speed of the driving member of the coupling until it equals or substantially equals that of the driven member of the coupling, so that engagement of the coupling can be effected, whereupon the valve of the transmitter will be operated to re-establish the hydraulic circuit to enable the drive to be transmitted from the engine in the usual way. Instead of using a coupling such as hereinbefore referred to, any suitable means for providing an interruption or disconnection of the transmission may be used, for example, any suitable construction of free wheel or one-way clutch device, either of the self-disengaging or other type can be used, and if desired, means may be provided for locking the free wheel or one-way clutch device to provide a positive or bi-directional drive, whilst a plurality of free wheel devices with suitable controlling or locking means may be provided. Instead of providing a coupling or clutch such as the Salerni coupling, at a position between the variable speed gearing and the road wheels, I may provide such means or any other form of interrupting or disengaging means at any position in the transmission, one convenient position being in the gear box or variable speed gearing itself, the control of the interrupting means in this case being associated with or combined with the controlling means of the hydraulic transmitter. According to a further feature of the invention I provide an improved construction of interrupting means in the form of a coupling or clutch of the Salerni type as set forth for example in the specification of British Patent No. 383,298 of 1931, wherein the displacement of synchronizing means is effected by frictional engagement of certain parts in conjunction with means whereby the necessary amount or increase of friction can be applied or effected to ensure proper displacement of the synchronizing means, for example, under conditions when perhaps the ordinary or light frictional engagement might not be sufficient and thus permit of engagement of the coupling members. For this purpose the coupling device may comprise friction means associated with a free wheel or one-way clutch device in combination with a friction slip device. The free wheel permits of the synchronizer ring revolving freely relatively to the driving member, but upon the driving member tending to overrun the synchronizer ring and the driven member which may be rotating this ring, the latter is moved by means of a frictional engagement between it and another ring forming part of or associated with the free wheel device, this friction being such as to ensure immediate or proper displacement of the said ring under all conditions, whilst nevertheless it provides a slipping means which allows relative movement between the synchronizer ring and the ring forming part of the free wheel device carried by the driving member in the event of the said ring coming into contact with any of the stops or projections on the driven member which under certain conditions serve to rotate the synchronizer ring. Other means may be provided for enabling the friction to be increased, for example, spring means in conjunction with inclined surfaces or differential spring devices may be used.

In order that the said invention may be clearly understood and readily carried into effect, the same will now be more fully described with reference to the accompanying drawings, in which:—

Figure 3 is a generally similar view to that illustrated in Figure 2 showing the valve of a hydraulic power transmitter closed and the interrupting device in the disengaged position, but ready to engage.

Figure 4 is a transverse sectional view taken on the line 4—4 of Figure 2.

Figure 5 is a diagrammatic view of the control mechanism in the position it occupies when the parts are in the position shown in Figure 2.

Figure 6 is a diagrammatic view illustrating the control mechanism in the position it occupies when the valve of the hydraulic power transmitter is closed and the interrupting device is disengaged with the transmitter brake applied.

Figure 7 is a similar view to that shown in Figure 6, but illustrating the position when the transmitter brake is released, the interrupting device being disengaged but ready to re-establish the drive as hereafter described.

Figure 8 is a face view partly in section of the driving member of one form of the interrupting device or coupling.

Figure 9 is a face view of the driven member of the interrupting device or coupling.

Figure 10 is an enlarged side view partly in section of the interrupting device or coupling.

Figure 1:
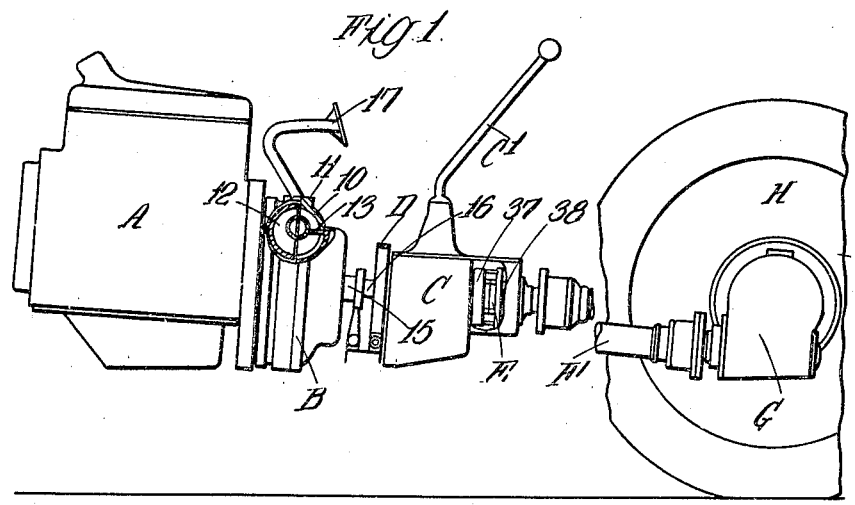
Figure 1 is a diagrammatic view of one construction of the power transmission mechanism of a mechanically propelled vehicle according to this invention.
Figure 2:
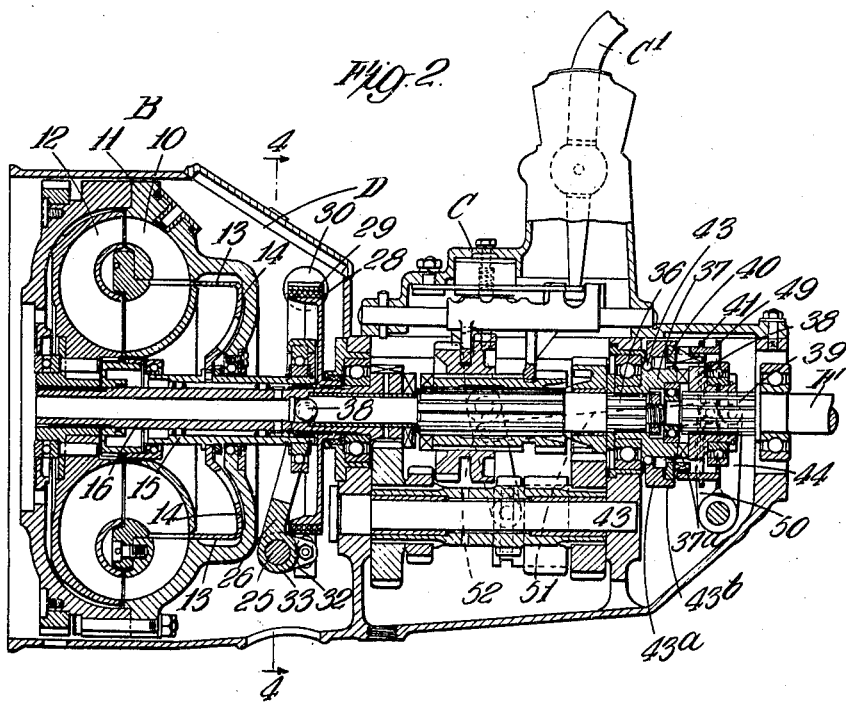
Figure 2 is a vertical sectional view of a hydraulic power transmitter, the variable speed gearing, the clutch stop or transmitter brake and an interrupting device, incorporated in the construction shown in Figure 1, the parts being shown in the operative position with the gearing in "neutral."

Referring more particularly to Figure 1, A represents the engine; B indicates the hydraulic power transmitter; C indicates the variable speed gearing with its operating lever $C^1$; D represents the clutch stop or transmitter brake; E represents the interrupting device which in the example illustrated is one form of the Salerni coupling interposed between the propeller shaft F and the variable speed gearing C; G is the differential gearing, and H represents one of the driving wheels of the vehicle. The hydraulic power transmitter is of the Föttinger type and comprises an impeller or driving vane wheel 10 mounted on or forming part of a casing 11 which is secured to the shaft of the engine A and contains the turbine or driven vane wheel 12, the vanes of both the impeller and the turbine being disposed in the liquid circuit as is usual in this type of transmitter. The formaton or arrangement of the vanes may be as set forth in the specification of my British Patent No. 362,952, so as to give a slight torque conversion at a ratio of approximately 1 to 1, but the vanes may be of any other suitable or usual type. A valve in the form of a ring 13 is adapted to be moved into or withdrawn from the liquid circuit on the impeller side and it is carried on a disc or plate 14 which is adapted to be moved for the purpose of inserting or withdrawing the valve by means of an axially movable sleeve 15 (to which the disc is suitably secured) that surrounds the driven shaft 16 carrying the turbine or driven element 12 of the transmitter. The valve is not connected with the impeller or the turbine and is therefore free, and as shown is capable of rotating relatively to either of the elements. Normally the valve 13 with its disc 14 occupies a position in which it is withdrawn from the liquid circuit as shown in Figure 2, so that the rotation of the impeller by the engine causes the turbine to be rotated in the usual way thus driving the shaft 16. The valve 13 is operated so as to be inserted in or withdrawn from the liquid circuit by means of an operating lever or pedal 17 pivoted at 18 and having an extension 19 which by means of a link 20 is connected with a cam 21 having a slot 22 wherein is located a fixed roller 23. The said slotted cam 21 is connected with an arm 24 fixed on one end of a shaft 25 upon which is keyed a yoke 26 that engages with a flange or grooved collar 27 mounted on or forming part of a ball bearing on the sleeve 15 carrying the valve 13. With this construction, the depression of the pedal 17 will cause the cam 21 to be displaced through the medium of the link 20 and the formation of the slot is such that the initial movement of the cam results in it being so displaced as to move angularly the arm 24 and the shaft 25 so that the yoke 26 is similarly moved and causes the sleeve to be axially moved in a direction to project the vave 13 into the liquid circuit of the hydraulic transmitter. Mounted upon the transmitter or driven shaft 16 is a brake drum 28 which is adapted to be engaged by a brake band 29, one end of whch is secured to a spring 30 or other suitable anchorage (see Figure 4) the other end having attached thereto a rod 31 which is also connected with an arm 32 carried by a sleeve 33 loosely surrounding the shaft 25 and having an arm 34 that is connected by a link 35 to the extension 19 of the operating pedal 17. When the operating pedal is depressed as aforesaid, so as to cause the valve to project into the liquid circuit, the link 35 causes the sleeve 33 to be moved angularly so that the arm thereon moves the rod 31 upwardly, thus applying the brake band 29 to the brake drum 28 in order to arrest or quickly stop the rotation of the transmitter shaft 16. The transmitter shaft which normally is rotated at substantially the same speed, and with the same torque, as the engine shaft by means of the hydraulic power transmiter, extends into the variable speed gear C, which in the example shown is of the lay shaft type, although the gearing may be of any other suitable kind. For example, the epicyclic gearing as set forth in application Serial No. 487,186 with or without the various synchronizing devices referred to, may be used. Further description of the variable speed gearing is unnecessary, it being understood that the gearing shown is operated in the usual way by means of the gear lever $C^1$ in order to make the various changes of gear, the power being transmitted from the variable speed gearing shaft 36 on which is secured the driving member 37 of the interrupting device, which in the example shown is a Salerni coupling, the driven member 38 of this coupling being slidably secured to a shaft 39 connected with or forming part of the propeller shaft F (see Figures 2 and 3). The coupling illustrated is generally similar to that covered by my Patent No. 1,836,773, dated December 15, 1931, and it may comprise a synchronizer ring 40 between the coupling members 37 and 38; this ring having seatings or distance pieces 41 that can be engaged by seatings 42 (see Figure 9) on the driven member so as to prevent the dogs or teeth 37a and 38a on the coupling members 37 and 38 respectively, from engaging after these members have been disengaged or uncoupled so long as the two members are rotating at different speeds, the synchronizer ring 40 being rotated by the driven member freely and anti-frictionally relatively to the driving member, owing to the free wheel or ratchet device 43 associated with the synchronizer ring and the driving member. In the example shown, the synchronizer ring 40 is mounted within the ring 43a surrounding the rollers of the free wheel and a frictional or slipping connection is provided between the two rings by the engaging coned seatings as shown at 43b (see Figure 10). Normally the synchronizer ring 40 occupies a position in which its seatings can project into gaps 42a (see Figure 9) on the driven member so that it does not hold the driven and driving members of the coupling apart, with the result that the aforesaid dogs or teeth 37a and 38a are in engagement, thus enabling the drive to be transmitted positively and bi-directionally. In order to withdraw the driven and slidable coupling member 38, it is connected with an operating yoke lever 44 to which is attached a link 45 by means of a pin and slot or lost motion connection 46, the said link being attached to the operating pedal at 47. The depression of the operating pedal for the purpose of actuating the valve and applying the transmitter brake or clutch stop as aforesaid, first results in the lost motion at the connection 46 being taken up so that the initial movement of the pedal does not operate the yoke 44, but continued depression of the operating pedal results in the link 45 angularly displacing the said yoke in order to slide or withdraw the driven coupling member 38 from engagement with the driving coupling member 37. As the valve has first been closed, the driving torque is removed from the driven parts so that the coupling member 38 can be readily withdrawn. This sliding movement of the coupling member 38 is effected against the action of a return spring 48 which acts on the said yoke and in the example shown is also attached at 49 to the operating pedal, so that this spring serves to effect return movements of all the parts that are moved against the action of the spring as a result of the depression of the operating pedal, although independent return springs may be used.

Assuming that the parts are in the position shown in Figure 2, that is, in the operative position, and that the engine is running either with the gear in "neutral" or with a gear engaged, and it is desired to engage a gear or to change gear, the operating pedal 17 is depressed. The initial depression of the pedal first causes the valve 13 to be inserted into the liquid circuit as hereinbefore described, and at the same time or substantially at the same time, the brake band 29 is caused to approach the brake drum 28 on the transmitter shaft but without applying the brake. The connection with the brake band is such that a certain amount of slack or lost motion is taken up before the brake is fully applied. The transmitter is therefore rendered practically inoperative so far as transmitting the drive is concerned, but it will be understood that there is a slight drag due to fluid friction in the transmitter, which causes the turbine shaft 16 to be rotated, it being understood that at this time the torque is removed from the gearing and the parts driven thereby. The initial depression of the pedal 17 does not disengage or withdraw the coupling member 38 owing to the rod or link 45 taking up the lost motion, but as soon as this lost motion has been taken up, the continued depression of the pedal 17 causes the rod 45 to actuate the yoke lever 44 in order to withdraw the driven coupling member 38 from engagement with the driving coupling member, that is, after the torque on the driven parts has been removed or substantially reduced by the introduction of the valve 13 into the liquid circuit in the transmitter as aforesaid. After the coupling has been disengaged the brake band 29 is applied to the brake drum 28 by continued movement of the pedal. As a result of the coupling member 38 being withdrawn, after the torque has been removed from the driven parts, the variable speed gearing is disconnected from the driving road wheels and as the hydraulic transmitter has been rendered inoperative by inserting the valve of the liquid circuit, the variable speed gearing is practically isolated. The application of the brake to the transmitter shaft retards or arrests rotation of this shaft, with the result that the gear wheels in the variable speed gearing are quickly decelerated or brought to rest or approximately so, thereby enabling a change of gear or engagement of gear to be easily effected by manipulating the gear lever in the ordinary way. After changing or engaging gear, the pedal 17 is released and during the return movement under the influence of the spring 48, the brake band is removed from the drum of the transmitter brake, thus freeing the shaft 16. At this time the driven member of the coupling will be rotating faster than the driving member and it is prevented from engaging with the latter by the interposed synchronizer ring 40 which is rotated with and by the driven member so long as the speed of the latter exceeds that of the driving member, the synchronizer ring free wheeling relatively to the driving member. Owing to the driven member being acted upon by the return spring, it causes the coned seatings 43b of the synchronizer ring 40 and the free wheel ring 43a to be pressed together, so that the two rings rotate freely relatively to the driving member. Since therefore the driven member of the coupling is prevented from returning to its operative or engaging position by the synchronizer ring, the operating yoke lever 44 retains the rod or link 45, the pedal 17 and the valve sleeve 15 in a position in which the valve 13 of the hydraulic transmitter is retained in the liquid circuit. Therefore, it will be understood that although the brake band 29 no longer engages with the transmitter brake drum 28, the valve 13 of the hydraulic transmitter has not been withdrawn, so that the transmitter shaft 16 is rotated due to the fluid friction or drag in the transmitter. Under these conditions the vehicle can coast or free wheel so long as the speed of the driving road wheels, that is to say, the driven side of the coupling, exceeds that of the driving side. By accelerating the engine and increasing the speed of rotation of the impeller 10 of the hydraulic transmitter, the rotational speed of the turbine 12 and the driven shaft 16 and of the gearing and the driving coupling member 37 is increased, and upon the said coupling member tending to rotate faster than the driven member 38, it will, due to the friction existing between the aforesaid coned seatings 43b of the free wheel ring and the synchronizer, rotationally displace the latter in the reverse direction from that in which it has been rotating, so that the seatings 41 holding the driven coupling member in the disengaged position are rotationally displaced, thereby allowing the driven coupling member to engage with the driving member under the influence of the return spring 48 acting on the operating yoke lever 44. Thus the dogs on the driven coupling member engage with those on the driving member in order to establish a positive bi-directional drive. Owing to the provision of the inclined or coned seatings 43b between the synchronizer ring and the free wheel ring, a friction slip is provided which may be desirable or necessary in order to prevent any tendency for the driven coupling member to be rotated by the synchronizer ring through the free wheel device. After re-engagement of the driven coupling member with the driving member as aforesaid, the pedal 17 is also returned to its normal position by the aforesaid return spring 48, and by means of the aforesaid link and cam connection, the axially movable sleeve is moved in the direction to withdraw the valve 13 from the liquid circuit so that the normal drive is re-established. The sequence of operations hereinbefore described can take place for each gear change and for starting from neutral, whilst for free wheeling or coasting purposes it is merely necessary to depress the pedal sufficiently to interrupt the liquid circuit by inserting the aforesaid valve and to disengage the Salerni coupling, automatic re-establishment of the drive being effected when rotational synchronism between the coupling members is attained as aforesaid. If desired, the engaging seatings on the synchronizer ring and the driven member may be inclined in a direction which tends to prevent unrequired or accidental displacement of the said ring. For reversing, the pedal 17 is depressed so as to insert the valve 13 into the liquid circuit and to uncouple the coupling members as aforesaid, and as the synchronizer ring tends to hold these members apart it is displaced when the reverse gear is operated to allow the coupling members to re-engage immediately. For this purpose the synchronizer ring is adapted to be rotationally displaced by means of a slidable sleeve 49 that can be actuated by a lever 50 and a link 51 connected with a reverse gear lever or selector 52. The sleeve 49 is preferably splined on the driven coupling member and is provided with inclined or cam surfaces 49a which upon axial movement of the said sleeve engage with similar surfaces 49b on the synchronizer ring in order to cause rotational displacement of the said ring, thus allowing the driven coupling member to re-engage with the driving member under the influence of the aforesaid return spring.

In a modification, instead of using a single return spring as in the foregoing example, independent springs of the like may be provided. For example, the pedal may be returned to its normal position after being depressed and in this case the valve in the hydraulic transmitter may be retained in the closed position by a latch device which is released when the coupling re-establishes its driving connection, the coupling and/or the other parts being acted upon by separate or independent springs.

I have disclosed in Figure 11 a structure embodying independent springs and a latch device for retaining the valve of the transmitter in closed position. The pedal 17' is pivoted at 18' and has secured thereto arm 19' for actuating the transmitter valve, the brake, and the interrupting device. Pedal 17' is biased to its normal position by spring 54. The actuating rod 31' for the brake mechanism is directly connected to arm 19' as at 70. The valve operating cam 21' is pivoted to the valve shifting fork 26' and is also connected to arm 19' by the link 20'. The cam has a cam groove 22' which cooperates with the roller 23' in a manner similar to the structure previously described.

The arm 44' which operates the interrupting mechanism is biased to its normal position by the independent spring 53 and also has connected thereto a rod 45' whereby the interrupting mechanism may be actuated by the control pedal 17'. The rod 45' is pivoted to a lever 55 which is provided with an arm 56 carrying a roller 57. In order to provide means for actuating the interrupting means from the pedal, the arm 19' has fixed thereto a member 58 provided with a cam surface 59 for cooperation with the roller 57 carried by the lever 55. The latch mechanism for maintaining the valve in closed position comprises a lug 60 on lever 55 which cooperates with a lug 61 on the member 58. The arm 19' has cooperating therewith a stop member 62 which may be adjusted by shims 63 to thus control the outward limit of travel of the valve.

In operation of the structure just described, when the pedal 17' is initially depressed, the cam member 21' is rotated, and by means of the cam groove 22' and the roller 23', the valve is inserted in the liquid circuit of the transmitter. Further movement of the pedal 17' will not operate the valve, due to the form of the cam groove 22'. However, this additional movement of the pedal results in the cam surface 59 engaging the roller 57 on the lever 55 to thereby operate the interrupting device. Still further movement of the pedal results in application of the brake in a manner as previously described.

When the pedal 17' is released, the brake will first be released and the members of the interrupting device will be brought into cooperating position by means of the spring 53 after the cam surface 59 has moved away from the roller 57. The members of the interrupting device, however, will not become engaged owing to the inter-position of the synchronizing means which functions in the manner as hereinbefore described. Since the members of the interrupting device do not become engaged, the lever 55 will not return to its normal position and as the result of this, the lug 60 will remain in the path of and be engaged by the lug 61 on the member 58. The engagement of lugs 60 and 61 prevents the arm 19' from returning the valve operating cam 21' to its normal position which would withdraw the valve from the liquid circuit. When the elements of the interrupting device have become synchronized so that they may engage, the lug 60 is withdrawn from the path of the lug 61, thus permitting the spring 54 to withdraw the valve from the liquid circuit. It will be seen that by means of the latch mechanism, the operator's foot may be completely withdrawn from the pedal but the valve will not be withdrawn from the liquid circuit until the elements of the interrupting device have become synchronized and engaged.

What I claim and desire to secure by Letters Patent of the United States is:—

1. Power transmission mechanism for motor vehicles including an engine, a variable speed gearing, a hydraulic power transmitter between the engine and speed gearing having a liquid circuit, said power transmitter having a valve, means for inserting the valve into and withdrawing it from the liquid circuit, a device for interrupting the transmission for the purpose of coasting and to facilitate gear changing when the valve is inserted in the liquid circuit, a brake acting on the driven member of the transmitter, a single actuating lever and a link mechanism operatively connected to said valve, said brake and the interrupting device, said link mechanism having a lost motion connection with the interrupting device whereby upon the actuation of the lever, the valve is moved to its closed position, the interrupting device is operated and the brake applied.

2. Power transmission mechanism for motor vehicles including an engine, a variable speed gearing, a hydraulic power transmitter between the engine and speed gearing having a liquid circuit, said power transmitter having a valve, means for inserting the valve into and withdrawing it from the liquid circuit, a device for interrupting the transmission to facilitate gear changing when the valve is inserted in the liquid circuit comprising driving and driven members, a member operatively connected to the valve and the interrupting device arranged when actuated to insert the valve in the liquid circuit and disconnect the driving and driven members of the interrupting device, and means associated with the interrupting device to maintain the driving and driven members disconnected and to retain the valve in the circuit until rotational synchronism between the driving and driven members is attained.

3. Power transmission mechanism for motor vehicles including an engine, a variable speed gearing, a hydraulic power transmitter between the engine and speed gearing having a liquid circuit, said power transmitter having a valve, means for inserting the valve into and withdrawing it from the liquid circuit, a device for interrupting the transmission to facilitate gear changing when the valve is inserted in the liquid circuit comprising driving and driven members, a pedal operatively connected to the valve and interrupting device, said pedal when actuated inserting the valve in the liquid circuit and disconnecting the driving and driven members of the interrupting device, and means included in said interrupting device to maintain the driving and driven means disconnected and to retain the valve in the circuit until rotational synchronism between these members is attained, a brake operatively connected to said pedal, said pedal arranged to move the brake toward applied position to retard the transmitter shaft after inserting the valve and on its return movement releasing the brake prior to reconnection of the driving and driven members of the interrupting device.

4. Power transmission mechanism for motor vehicles including an engine, a variable speed gearing, a hydraulic power transmitter between the engine and speed gearing having a liquid circuit, said power transmitter having a valve, means for inserting the valve into and withdrawing it from the liquid circuit, a device for interrupting the transmission for the purpose of coasting and to facilitate gear changing when the valve is inserted in the liquid circuit comprising driving and driven members, a lever operatively connected to the valve and the interrupting device, said lever arranged to actuate the valve and disconnect the driving and driven members of the interrupting device, a brake operatively connected to said lever, means whereby said lever applies the brake to the transmitter shaft after inserting the valve, lever and link mechanism interconnecting the valve, the brake, and the interrupting device, means associated with said interrupting device to maintain the driving and driven members disconnected and to retain the valve in the circuit until rotational synchronism of the driving and driven members is attained, and yieldable means for moving the driving and driven members of the interrupting device into engagement.

5. Power transmission mechanism for motor vehicles including an engine, a variable speed gearing, a hydraulic power transmitter between the engine and speed gearing having a liquid circuit, said power transmitter having a valve, means for inserting the valve into and withdrawing it from the liquid circuit, a device for interrupting the transmission for the purpose of coasting and to facilitate gear changing when the valve is inserted in the liquid circuit comprising driving and driven members, a pedal operatively connected to the valve and the interrupting device, a brake operatively connected to the pedal, means whereby the pedal applies the brake to the transmitter shaft after inserting the valve, lever and link mechanism interconnecting the valve, said brake and the interrupting device, means associated with said interrupting device to maintain the driving and driven members of the interrupting device disconnected and to retain the valve in the circuit until rotational synchronism of the driving and driven members is attained, and yieldable means for moving the driving and driven members of the interrupting device into engagement, said lever and link mechanism comprising a lost motion device that enables the pedal to be operated initially without operating the interrupting device.

6. A power transmission for motor vehicles having in combination an engine shaft, a driven shaft and a propeller shaft, a hydraulic power transmitter having a liquid circuit and having an impeller connected to the engine shaft and a turbine element connected to the driven shaft, a valve arranged to be moved into and out of the impeller for controlling the flow of liquid in the liquid circuit of the transmitter, a variable speed gearing operatively connected to said driven shaft, a brake associated with said driven shaft, means for interrupting the transmission to facilitate gear changing and including relatively movable elements arranged to establish positive reconnection of drive between the hydraulic transmitter and the vehicle wheels upon synchronism of the elements being attained, and single means operatively connecting the valve and brake whereby the valve can be inserted into the liquid circuit of the transmitter and the brake applied, so that the transmitter may be checked and the driven element arrested regardless of engine speed and with negligible braking effect on the engine.

7. A power transmission for motor vehicles having in combination an engine shaft, a driven shaft and a propeller shaft, a hydraulic power transmitter having a liquid circuit and having an impeller connected to the engine shaft and a turbine element connected to the driven shaft, a valve arranged to be moved into and out of the impeller for controlling the liquid circuit of the hydraulic power transmitter, a change speed gearing connected to said driven shaft, a brake associated with said driven shaft, an interrupting device for facilitating gear changing and including relatively movable elements arranged to establish positive reconnection of drive between the hydraulic transmitter and the propeller shaft upon synchronism of the elements being attained, and a single means operatively connecting the valve, the interrupting device and the brake.

8. A power transmission for motor vehicles having in combination an engine shaft, a driven shaft and a propeller shaft, a hydraulic power transmitter having a liquid circuit and having an impeller connected to the engine shaft and a turbine element connected to the driven shaft, a valve arranged to be moved into and out of the impeller for controlling the flow of liquid in the liquid circuit of the hydraulic power transmitter, a positive change speed gearing connected to said driven shaft, a brake associated with said driven shaft, an interrupting device interposed between the positive change speed gearing and the propeller shaft, said interrupting device including a driving member connected to the driven shaft and a driven member connected to the propeller shaft, said members being movable relative to each other, an operating lever and linkage system connected to said brake, said valve and interrupting device, and means common to said interrupting device, said lever and linkage system for maintaining the valve inserted in the liquid circuit and applying the brake after the disconnection of the interrupting device.

9. A power transmission for motor vehicles having in combination an engine shaft, a driven shaft and a propeller shaft, a hydraulic power transmitter having a liquid circuit and having an impeller connected to the engine shaft and a turbine element connected to the driven shaft, a valve arranged to be moved into and out of the impeller for controlling the flow of liquid in the liquid circuit of the hydraulic power transmitter, a positive change speed gearing connected to said driven shaft, a brake associated with said driven shaft, an interrupting device interposed between the positive change speed gearing and the propeller shaft, said interrupting device including a driving member connected to the driven shaft and a driven member connected to the propeller shaft, said members being movable relative to each other, and means associated with the interrupting device for preventing withdrawal of the valve from the liquid circuit until after release of the brake.

10. A power transmission for motor vehicles having in combination an engine shaft, a driven shaft and a propeller shaft, a hydraulic power transmitter having a liquid circuit and having an impeller connected to the engine shaft and a turbine element connected to the driven shaft, a valve arranged to be moved into and out of the impeller for controlling the flow of liquid in the liquid circuit of the hydraulic power transmitter, a positive change speed gearing connected to said driven shaft, a brake associated with the driven shaft, an interrupting device interposed between the positive change speed gearing and the propeller shaft, said interrupting device including a driving member connected to the driven shaft and a driven member connected to the propeller shaft, said members being movable relative to each other and arranged to establish positive reconnection of drive between the change speed gearing and the propeller shaft upon synchronization of the members being attained, and means included in said interrupting device to prevent reconnection of the driving and driven members until after release of the brake.

11. A power transmission for motor vehicles having in combination an engine shaft, a driven shaft and a propeller shaft, a hydraulic power transmitter having a liquid circuit and having an impeller connected to the engine shaft and a turbine element connected to the driven shaft, a valve arranged to be moved into and out of the impeller for controlling the flow of the liquid in the liquid circuit of the hydraulic power transmitter, a positive change speed gearing connected to said driven shaft, a brake associated with the driven shaft, an interrupting device interposed between the positive change speed gearing and the propeller shaft, said interrupting device including a driving member connected to the driven shaft and a driven member connected to the propeller shaft, said members being movable relatively to each other and arranged to establish positive reconnection of drive between the change speed gearing and the propeller shaft upon synchronism of the members being attained, a lever and link mechanism interconnecting the valve, brake and interrupting device, said lever and link mechanism including a lost motion connection that permits the valve to be operated without actuating the interrupting device.

12. A power transmission for motor vehicles having in combination an engine shaft, a driven shaft and a propeller shaft, a hydraulic power transmitter having a liquid circuit and having an impeller connected to the engine shaft and a turbine element connected to the driven shaft, a valve arranged to be moved into and out of the impeller for controlling the flow of liquid in the liquid circuit of the hydraulic power transmitter, a positive change speed gearing connected to said driven shaft, a brake associated with said driven shaft, an interrupting device interposed between the hydraulic transmitter and the propeller shaft, said interrupting device including a driving member connected to the driven shaft and a driven member connected to the propeller shaft, said members being movable relative to each other, lever and link mechanisms interconnecting the valve, brake and interrupting device, said lever and link mechanisms including a lost motion connection which effects the actuation of the valve, the operation of the interrupting device and application of the brake.

13. A power transmission for motor vehicles having in combination an engine shaft, a driven shaft and a propeller shaft, the hydraulic power transmitter having a liquid circuit and having an impeller connected to the engine shaft and a turbine element connected to the driven shaft, a valve arranged to be moved into and out of the impeller for controlling the flow of liquid in the liquid circuit of the hydraulic power transmitter, a positive change speed gearing connected to said driven shaft, a brake associated with said driven shaft, an interrupting device interposed between the positive change speed gearing and the propeller shaft, said interrupting device including a driving member connected to the driven shaft and a driven member connected to the propeller shaft, said members being movable relative to each other, a pedal operatively connected to the valve, brake and the driven member of the interrupting device, and means included in said interrupting device for maintaining the driving and driven members of the interrupting device disconnected and for retaining the valve in the circuit until rotational synchronism between the driving and driven members is attained, said pedal moving the brake toward applied position when the valve is inserted in the liquid circuit and on its return movement releasing the brake prior to the reconnection of the driving and driven members of the interrupting device.

14. A power transmission for motor vehicles having in combination an engine shaft, a driven shaft and a propeller shaft, the hydraulic power transmitter having a liquid circuit and having an impeller connected to the engine shaft and a turbine element connected to the drive shaft, a valve arranged to be moved into and out of the impeller for controlling the flow of the liquid in the liquid circuit of the hydraulic power transmitter, a positive change speed gearing connected to said driven shaft, a brake associated with said driven shaft, an interrupting device interposed between the positive change speed gearing and the propeller shaft, said interrupting device including a driving member connected to the driven shaft and a driven member connected to the propeller shaft, said members being movable relative to each other and having interengaging parts, a synchronizing member interposed between the driving and driven members, a single means operatively connected to the valve, brake and driven member of the interrupting device for actuating the same, means for reversing the direction of rotation of the driven member including a slidable element on one of said relatively movable members of the interrupting device, means on the slidable element arranged to engage complementary means on the synchronizing member, and means for actuating said slidable element whereby to effect reverse movement of the driven member.

15. Power transmission for a motor vehicle including an engine, a hydraulic power transmitter having a liquid circuit and having an impeller element connected to the engine, and a driven element in permanent operative relation with said impeller and receiving torque therefrom when the impeller is rotating, a valve in said transmitter for varying the torque-slip characteristics of the transmitter at a particular impeller speed, a change speed gearing connected to the driven element of the transmitter and to the vehicle wheels, a device in the connection between the change speed gearing and the vehicle wheels for interrupting transmission of power and comprising relatively movable elements for positively transmitting power upon synchronization thereof, a brake for the driven element of the hydraulic transmitter adapted to overcome the torque applied to said driven element by the impeller and to stop the rotation of said driven element when the valve is in closed position, a single control element common to the valve and the brake, and connections between the control element and the interrupting device whereby the elements of the interrupting device will be disengaged during movement of said control element in brake applying direction.

16. Power transmission mechanism for motor vehicles including an engine, variable speed gearing, a hydraulic power transmitter between the engine and the gearing, said transmitter comprising an impeller and a driven element in permanent operative relation and capable of transmitting torque whenever the engine is operating, a brake for the driven element of the transmitter, a drive interrupting device interposed between the variable speed gearing and the wheels of the vehicle, said interrupting device including a driving element connected to the gearing and a driven element connected to the wheels of the vehicle, said elements being provided with interengageable teeth and being movable relative to each other and arranged to establish positive reconnection of drive between the gearing and the wheels upon synchronization of the elements being attained, means for applying said brake, connections between said means and the interrupting device whereby the teeth of the elements of the interrupting device will be moved to disengaged position before the brake is applied, and means included in said interrupting device and the connections to the brake applying means to prevent contact of the cooperating teeth and reconnection of the drive and driven elements until after release of the brake and until the elements are rotating at substantially synchronous speeds.

PIERO MARIANO SALERNI.